Patented May 2, 1950

2,506,062

UNITED STATES PATENT OFFICE 2,506,062

FIRE EXTINGUISHING COMPOSITION AND METHOD

Warren F. Busse and Joseph P. Dailey, Easton, Pa., assignors to General Aniline & Film Corporation, New York, N. Y., a corporation of Delaware No Drawing. Application January 12, 1946, Serial No. 641,012

20 Claims. (Cl. 252—3)

The present invention relates to fire extinguishing and new compositions for extinguishing fires and more particularly to such compositions which when combined with water and a gas, such as air, will produce fire extinguishing foams highly effective for extinguishing fires of flammable liquids.

It has already been proposed to prepare foam forming solutions which contain certain wetting agents and foam stabilizers. Preparations heretofore proposed are made up from various proteins, such as soy bean proteins, proteins from hoofs, albumen, and blood. However, the foams produced from such compositions, while more or less effective in extinguishing certain types of fires, do not produce a foam which is satisfactorily stable toward heat. As a result, large quantities of foam applied continuously and in great mass and the building up of thick foam blankets are required for extinguishing the fires. Such solutions, accordingly, have been unsatisfactory in the extinguishment of spill and crash fires, such as airplane crash fires, since in the case of these fires, there are no protecting walls to retain thick layers of foam.

It is, accordingly, an object of our invention to produce solutions which readily form foam and which produce foams that have high heat stability.

It is a further object of our invention to produce foams which will extinguish fires with a thinner foam blanket.

Other objects of our invention are to provide foams which quickly spread and flow readily over the flammable liquid and possess self-sealing qualities, so that if for any reason the blanket of foam is broken, the break quickly seals itself and the fire is rapidly extinguished.

Another object of our invention is to provide solutions which generate foams that are highly impermeable to gases, thereby preventing evaporation of the flammable liquid and quickly extinguishing the fires.

A still further object of our invention is to provide a simple method for extinguishing flammable liquid fires, which extinguishes fires with minimum amounts of foam.

According to our invention, the above and other objects of the invention, which will be evident from the description which follows, are accomplished by providing a composition containing certain surface tension reducing agents which not only have a low surface tension, but also a high foaming power in combination with a foam stabilizer which comprises a copolymer of a vinyl ether with maleic anhydride. More particularly, the vinyl ether is a vinyl alkyl ether, such as, for example, vinyl methyl ether, vinyl ethyl ether, vinyl propyl ether, and their homologues. The preferred copolymer is that of maleic anhydride and vinyl methyl ether. It shows unusual foam stabilizing properties.

In general, our compositions are prepared by making up a concentrated aqueous solution of the surface tension reducing agent and the copolymer of the vinyl ether and maleic anhydride. These concentrated solutions are readily converted into foam suitable for extinguishing fires by any of the so-called mechanical methods, such as by entraining a gaseous medium, for example, air, into a moving stream of water into which the concentrated solutions of surface tension reducing agent and copolymer are introduced in any desired proportion. In practice, the concentrated solution is merely introduced into the flowing stream of water in which air or other gas in entrained. This may be done by use of any of the standard types of foam producing nozzles which suck in the air and the form producing material in such a manner that the latter is added to the stream of water in the desired dilution ratio. The foam may also be obtained by beating air into the solution with the desired amount of water.

The advantages of our novel compositions are that they readily form abundant foam, and that the foam produced is highly stable to heat, requiring no metal salts as heretofore required with protein foams to stabilize them against heat. In addition, the foam is highly stable toward the flammable liquid to which it is applied. It floats on the liquid for very long periods of time and is not broken down by the liquid. Owing to its high stability, re-ignition or "flashbacks" of the flammable liquid, when it comes in contact with hot metal, is prevented by the heat-resistant, fire-smothering blanket produced by the foam.

In addition, the foam is highly impermeable to the vapors of the burning liquid, contains a considerable amount of water which aids in the extinguishment of the fire, and entrains the water in the foam bubbles so that the foam drains very slightly. Another feature of our foam producing compositions is that they form small size bubbles and that the foam can be formed from relatively concentrated solutions of the ingredients, thereby making it unnecessary to store and to transport large quantities of liquid.

Still another advantage of our compositions is that some of the surface tension reducing agents used form solutions which have a positive spreading coefficient, when applied to water-immiscible flammable liquids, such as benzene, toluene, xylene, kerosene, fuel oils and turpentine. By this, we mean that the surface tension of the solution plus the interfacial tension is less than the surface tension of the flammable liquid. As a result of such positive spreading coefficient, the solutions have a tendency spontaneously to cover the flammable liquid with an aqueous film, thus reducing the rate of evaporation and aiding in the extinguishment of the fire. Thus, our solutions exert a double fire extinguishing action, namely, that of the aqueous film which tends to reduce evaporation and that of the foam which reenforces the film and smothers the fire. As a result of the action of the aqueous film on the surface of the fire, a thinner foam blanket will smother the fire. This means a considerable economy in the amount of foam solution required to extinguish a fire.

Because of the positive spreading coefficient, the foam tends to be self-sealing so that if the foam blanket is ruptured, it readily tends to seal itself and extinguish any flames in the area which has been uncovered. Since only a thin foam blanket is necessary to extinguish the fire, our foam solutions are highly effective for extinguishing crash and spill fires where there are no retaining walls to permit building up of heavy or thick foam blankets.

Illustrative of our invention are the following examples.

Example 1

An aqueous composition containing 1% of N-caprylyl, N-octyl taurine sodium salt and 0.5% of the copolymer of vinyl methyl ether and maleic anhydride is prepared by dissolving the ingredients in water and mixing them. This solution when introduced into a standard type of foam forming nozzle produces a foam in large quantities. When the foam was applied to a gasoline fire, it rapidly covered the fire with a foam blanket and extinguished the blaze in a few seconds.

Example 2

An aqueous solution containing 1% of lauryl sodium sulfate and 1% of the copolymer of vinyl methyl ether and maleic anhydride is prepared by dissolving the ingredients in water and mixing them. When this solution was mixed with air in the conventional Venturi type of foam forming nozzle, it produced a foam which rapidly covered a gasoline fire with a blanket of foam and extinguished the same within a few seconds.

Example 3

An aqueous solution containing 1% of N-caprylyl, N-octyl taurine sodium salt, 1% of the copolymer of vinyl methyl ether and maleic anhydride, and 0.2% of thiourea as a heat stabilizer for the solution is prepared by dissolving the ingredients in water and thoroughly mixing. The solution was passed through a standard foam forming nozzle. The resulting foam when applied to a gasoline fire rapidly covered the fire with a blanket of foam which quickly extinguished the fire.

Example 4

An aqueous solution containing 1% of a surface tension reducing agent which comprises the sodium salt of a sulfuric acid ester of a high molecular weight long chain alcohol and 1% of the water-soluble sodium salt of the copolymer of vinyl butyl ether and maleic anhydride is prepared by dissolving the ingredients in water and thoroughly mixed. Projected on to a gasoline fire by any conventional foam nozzle, the solution produced an abundant foam which extinguished the fire rapidly.

When N-heptoyl, N-heptyl taurine is substituted for the surface active agent in Example 4, the resulting solution also readily produced a foam which quickly extinguished fires. The ammonium salt of the copolymer may be substituted for the sodium salt.

The following tests illustrate the stability of the foam produced from our solutions as compared with stability of a foam produced from a commercial protein foam forming material. A half-inch layer of the commercial foam was placed on the surface of gasoline which had been poured into a 5-inch diameter Petri dish and a Bunsen burner flame was directed on the foam surface until the gasoline ignited. In the case of the commercial foam forming material the foam blanket was burned off and the gasoline was ignited in 23 seconds. On the other hand, where a half-inch layer of foam made from the composition of Example 1 was placed on a similar amount of gasoline and the same Bunsen flame was directed thereagainst, it required 64 seconds to burn off the foam and ignite the gasoline.

The difference in the drainage of the foams is illustrated by the following tests:

50 cc. of a 6% commercial foam solution was shaken in a 500 cc. graduate; the foam formed was permitted to stand; and the amount of water draining from the foam and collecting in the bottom of the graduate was noted. After 10 seconds it was noted that 5 cc. of water had collected in the bottom of the graduate. When the same test was carried out using the same amount of solution of the composition of Example 2, no drainage occured after 5 seconds and 5 cc. of solution was noted in the bottom of the flask only after 90 seconds had elapsed.

The copolymer of the vinyl alkyl ether and maleic anhydride utilized in our foam forming compositions may be of the low viscosity or high viscosity type. For example, in the case of the copolymer of maleic anhydride and vinyl methyl ether, the type used may be such that a solution of one gram of the copolymer in 100 ml. of methyl ethyl ketone may have an intrinsic viscosity of from 0.50 to 2.50 at 25° C. An intrinsic viscosity of from 0.50 to 0.80 is regarded as a low viscosity copolymer, from 0.80 to 1.5 a medium viscosity type, while those copolymers having an intrinsic viscosity of over 1.5 are regarded as high viscosity copolymers. Either the low, medium, or high viscosity copolymer may be used to prepare our foam forming solutions, but in general, if the low viscosity copolymers are used, larger amounts are required than if the higher viscosity polymers are used. The copolymers of vinyl methyl ether and maleic anhydride are nearly colorless and in the form of a heavy powder. Ready solubility in water of the copolymer of maleic anhydride and the vinyl lower alkyl ethers, such as methyl-, ethyl vinyl ether, is obtained by converting the anhydride groups retained in the copolymer into carboxyl groups. This may be done by merely heating the copolymer in water.

The copolymers in addition to serving as a foam stabilizer, also tend to reduce the surface tension of the water. The addition of small amounts of thiourea, either before or after conversion of the anhydride groups into carboxyl groups, improves the heat stability of water solutions of the copolymers. From 0.1–2.0% of thiourea may be added to the aqueous solution for this purpose, although it is preferred to use about 0.2% in the foam forming solution.

The water-soluble salts of the copolymers, such as, for example, the ammonium, sodium, potassium salts may also be used in our foam forming solutions. Thus, the ammonium, sodium, and potassium salts of the copolymer of vinyl butyl ether and maleic anhydride readily dissolve in water. These not only have a stabilizing action on the foam produced by our foam forming solutions, but also form foam and thereby contribute to the total amount of foam formed by the foam forming solution.

An advantage of the copolymers is that they may be formed in highly concentrated solutions, and may be readily diluted by the addition of the desired amount of water to produce the final foam forming solution.

In general, the concentration of the copolymer in the final foam forming solution may range from about 0.1% to about 2% and that of the surface tension reducing agent from about 0.25% to about 5%. However, preferable and highly effective are concentrations of 1% of the surface tension reducing agent and 1% of the copolymer. Where a concentrated solution of our compositions is used, as for example, containing 20% of the copolymer and a similar amount of the surface tension reducing agent, the dilution ratio of the concentrated solution to water in preparing the foam is from about 1 to 20 to about 1 to 7, a ratio of about 1 to about 16 being preferred. The ratios are expressed in terms of gallons of concentrated solution to gallons of water. In addition to sodium lauryl sulfate, there may be also used other salts of other sulfuric esters of high aliphatic alcohols containing more than 8 carbon atoms, such as the sodium, potassium and ammonium salts of nonyl, decyl, undecyl, hexadecyl and octadecyl sulfates or mixtures thereof. In addition to the N-caprylyl, N-octyl taurine, N-acyl, N-alkyl taurines may be used in which the acyl and the alkyl radicals each contain at least 7 carbon atoms as, for example, N-heptoyl, N-heptyl taurine; N-heptoyl, N-octyl taurine; N-2-ethyl hexoyl, N-octyl taurine; N-lauroyl, N-lauryl taurine; and N-dodecoyl, N-amyl taurine; and the alkali metal salts thereof, such as the sodium, potassium, and ammonium salts. Examples of other surface tension reducing agents which may be used include the alkali metal salts of the dialkyl esters of sulfosuccinic acid, e. g. dihexyl sodium sulfosuccinate, diamyl sodium sulfosuccinate, dioctyl sodium sulfosuccinate and diisobutyl sodium sulfosuccinate; the alkali metal and ammonium salts of trialkyl sulfotricarballylates, such as the sodium and ammonium triisobutyl sulfotricarballylates; alkali metal salts of alkylnaphthalenesulfonic acids, e. g. sodium diisopropyl naphthalenesulfonate; pentadecanone sodium sulfonate and alkylphenol-ethylene oxide condensation products, e. g. the diisobutylphenolethylene oxide condensation product.

It is to be understood that the above examples are merely by way of illustration and that various modifications may be made without departing from the spirit of the invention.

We claim:

1. A composition of matter for producing fire extinguishing foam which essentially consists of an aqueous solution of at least 0.25% of a member of the group consisting of anionic, non-saponaceous surface-tension reducing agents and alkylphenol ethylene oxide condensation products which act as surface-tension reducing agents, and at least 0.1% of a copolymer of a vinyl ether and maleic anhydride.

2. A composition of matter for producing fire extinguishing foam which essentially consists of an aqueous solution of from 0.25 to 5% of a member of the group consisting of anionic, non-saponaceous surface-tension reducing agents and alkylphenol ethlyene oxide condensation products which act as surface-tension reducing agents, and from 0.1 to 2% of a copolymer of a vinyl ether and maleic anhydride.

3. A composition of matter for producing fire extinguishing foam which essentially consists of an aqueous solution of from 0.25 to 5% of a member of the group consisting of anionic, non-saponaceous surface-tension reducing agents and alkylphenol ethylene oxide condensation products which act as surface-tension reducing agents, from 0.1 to 2% of a copolymer of a vinyl ether and maleic anhydride, and from 0.1 to 2% of thiourea.

4. A composition of matter according to claim 2 in which the surface active agent is a sulfuric acid ester of an alcohol of high molecular weight.

5. A composition of matter according to claim 2 in which the surface active agent is an N-acyl, N-alkyl taurine.

6. A composition of matter according to claim 2 in which the surface active agent is a diisobutylphenol-ethylene oxide condensation product.

7. A composition of matter according to claim 2 in which the vinyl ether is a vinyl alkyl ether.

8. A composition of matter according to claim 2 in which the vinyl ether is a vinyl methyl ether.

9. A composition of matter according to claim 2 in which the vinyl ether is a vinyl butyl ether.

10. A composition of matter for producing fire extinguishing foam which essentially consists of an aqueous solution of from 0.25 to 5% of lauryl sodium sulfate and from 0.1 to 2% of a copolymer of vinyl methyl ether and maleic anhydride.

11. A composition of matter for producing fire extinguishing foam which essentially consists of an aqueous solution of from 0.25 to 5% of N-caprylyl, N-octyl taurine sodium salt and from 1.0 to 2% of a copolymer of vinyl methyl ether and maleic anhydride.

12. A composition of matter for producing fire extinguishing foam which essentially consists of an aqueous solution of from 0.25 to 5% of diisobutylphenol-ethylene oxide condensation product and from 0.1 to 2% of an alkali metal salt of a copolymer of vinyl butyl ether and maleic anhydride.

13. A method of extinguishing fires which essentially consists of bringing in contact with the burning material a foam produced from an aqueous solution of at least 0.25% of a member of the group consisting of anionic, non-saponaceous surface-tension reducing agents and alkylphenol ethylene oxide condensation products which act as surface-tension reducing agents, and at least 0.1% of a copolymer of a vinyl ether and maleic anhydride.

14. A method of extinguishing fires which essentially consists of bringing in contact with the burning material a foam produced from an aqueous solution of from 0.25 to 5% of a member of the group consisting of anionic, non-saponaceous surface-tension reducing agents and alklyphenol ethylene oxide condensation products which act as surface-tension reducing agents, and from 0.1 to 2% of a copolymer of a vinyl ether and maleic anhydride.

15. A method of extinguishing fires which essentially consists of bringing in contact with the burning material a foam produced from an aqueous solution of from 0.25 to 5% of a member of the group consisting of anionic, non-saponaceous surface-tension reducing agents and alkylphenol ethylene oxide condensation products which act as surface-tension reducing agents, from 0.1 to 2% of a copolymer of a vinyl ether and maleic anhydride, and from 0.1 to 2% of thiourea.

16. A method of extinguishing fires which essentially consists of bringing in contact with the burning material a foam produced from an aqueous solution of from 0.25 to 5% of a sulfuric acid ester of an alcohol of high molecular weight, and from 0.1 to 2% of a copolymer of a vinyl ether and maleic anhydride.

17. A method of extinguishing fires which essentially consists of bringing in contact with the burning material a foam produced from an aqueous solution of from 0.25 to 5% of an N-acyl, N-alkyl taurine.

18. A method of extinguishing fires which essentially consists of bringing in contact with the burning material a foam produced from an aqueous solution of from 0.25 to 5% of a diisobutylphenol-ethylene oxide condensation product.

19. A composition of matter for producing fire extinguishing foam, in concentrated form and adapted to be diluted with water prior to use, which essentially consists of an aqueous solution of about 20% of a member of the group consisting of anionic, non-saponaceous surface-tension reducing agents and alkylphenol ethylene oxide condensation products which act as surface-tension reducing agents, and about 20% of a copolymer of a vinyl ether and maleic anhydride.

20. A composition of matter for producing fire extinguishing foam which essentially consists of an aqueous solution of about 1% of a member of the group consisting of anionic, non-saponaceous surface-tension reducing agents and alkylphenol ethylene oxide condensation products which act as surface-tension reducing agents, and about 1% of a copolymer of a vinyl ether and maleic anhydride.

WARREN F. BUSSE.
JOSEPH P. DAILEY.

REFERENCES CITED

The following references are of record in the file of this patent:

UNITED STATES PATENTS

| Number | Name | Date |
|---|---|---|
| 1,843,420 | Guenther | Feb. 2, 1932 |
| 2,130,362 | Muncie | Sept. 20, 1938 |
| 2,154,231 | Daimler | Apr. 11, 1939 |
| 2,166,008 | Holter | July 11, 1939 |
| 2,220,867 | Kirk | Nov. 5, 1940 |
| 2,251,768 | Swain | Aug. 5, 1941 |
| 2,303,366 | Katzmann | Dec. 1, 1942 |
| 2,315,375 | Mawiasky | Mar. 30, 1943 |

FOREIGN PATENTS

| Number | Country | Date |
|---|---|---|
| 485,194 | Great Britain | May 16, 1938 |

OTHER REFERENCES

Goldsmith: Non-Ionic Surface Active Agents," Chemical Industries, March, 1943.

Certificate of Correction

Patent No. 2,506,062     May 2, 1950

WARREN F. BUSSE ET AL.

It is hereby certified that error appears in the printed specification of the above numbered patent requiring correction as follows:

Column 6, line 53, for "1.0 to 2%" read *0.1 to 2%*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*